Feb. 2, 1971  J. NARSTED  3,559,498
FLOATING PINION MOUNTING FOR REDUCTION GEAR UNITS
Filed March 26, 1969  2 Sheets-Sheet 1

INVENTOR
John Narsted
BY
Pennie, Edmonds, Morton, Taylor & Adams
ATTORNEYS

INVENTOR
John Narsted
BY
ATTORNEYS

United States Patent Office 3,559,498
Patented Feb. 2, 1971

3,559,498
FLOATING PINION MOUNTING FOR REDUCTION GEAR UNITS
John Narsted, Hampstead, Montreal, Quebec, Canada, assignor to Kennedy Van Saun Corporation, Danville, Pa., a corporation of Delaware
Filed Mar. 26, 1969, Ser. No. 810,682
Int. Cl. F16h 57/00
U.S. Cl. 74—410                    8 Claims

ABSTRACT OF THE DISCLOSURE

Mechanism for floating a high speed input shaft carrying a pinion for simultaneously driving a pair of similar gears, comprising a guiding mechanism floating the input shaft and pinion for small up and down movements, including a radius arm structure having a pair of spaced bearings on the shaft, the radius arm being pivoted laterally of the shaft on a pivot axis parallel to the shaft, and means for counterbalancing the weight of the shaft and pinion.

BACKGROUND OF THE INVENTION

(1) Field of the invention

The invention relates to reduction gearing systems or transmissions provided with means for floating an input shaft carrying a pinion or pinions for driving a pair of similar gears.

(2) Description of the prior art

In general, the floating of the input and output shafts of gearing systems has been proposed and means for floating of an output shaft has been used for a considerable number of years, particularly in a reduction gear system.

Examples of the type of proposed gearing systems are those of U.S. patent to Petersen No. 2,441,901, granted May 18, 1948, disclosing a gearing system for driving a mill, in which an end section of an unguided input drive shaft is supported for floating movement, and a U.S. patent disclosing a power transmission system in which the output shaft is floated, i.e., Mansachs patent No. 2,995,046, granted Aug. 8, 1961.

Having in mind the disclosures of the prior art and practices, the primary object of the present invention is to provide a reduction gear system or unit applicable to large industrial installations of 4,000 HP or greater, in which a guided floating drive pinion is used to equally divide the load between the two countershafts in a double reduction gear unit.

A further object of the invention is to provide a guiding and floating mechanism for the high speed input shaft and its pinion, to permit some up and down motion thereof and keep the shaft in parallel relationship to the shafts of the intermediate gear wheels to be driven. This will assure perfect pinion tooth alignment with the teeth of the two intermediate gear wheels and maintain correct depth of tooth engagement, while the load is being equally divided between the two intermediate gear wheels.

A further object of the invention is to provide a guiding mechanism for the input shaft and its pinion or pinions which will be located outside the main gear system where it may be readily observed and adjusted if necessary.

SUMMARY OF THE INVENTION

The present invention relates to an improved mechanism for supporting, guiding and floating a high speed power input drive shaft and its pinion for driving a pair of similar spaced intermediate gear wheels mounted on parallel shafts. According to the preferred construction, the similar gear wheels are mounted on parallel shafts and the input shaft is located parallel to the axes of those shafts in a position between the two gear wheels, so that the pinion on the input shaft simultaneously meshes with the pair of gear wheels to drive them in the same direction. Mechanism is provided for supporting, floating and guiding the input shaft and its pinion to permit slight movement in an up and down direction, so that a perfect division of power is obtained between the pinion gear and the pair of similar gear wheels driven thereby.

The preferred mechanism for mounting the input shaft comprises a radius arm pivoted laterally of the input shaft on a pivot shaft, the end portions of which are mounted in spaced fixed bearings. The radius arm extends from this pivot shaft and carries spaced bearings in which a considerable length of the input shaft is mounted, so that it is maintained in parallel relation to the pivot shaft and the shafts on which the pair of gear wheels are mounted.

There is a separate means associated with the radius arm mechanism for providing a balanced support of the input shaft, its pinion and the projecting end portion of the radius arm structure, in a manner to permit a small amount of up and down floating movement of the input shaft and its pinion. The balancing is provided by a heavy coil compression spring or springs whose only function is to carry the gravity load of the movable parts, and hence reduce the weight resistance to their movement. The high speed drive pinion and its two mating intermediate gears have single helical gear teeth of low helix angle to reduce the end thrust.

With this method of drive pinion mounting there is a perfect division of power directed to the two intermediate gears. At the same time the input shaft is held so that it can float up and down a slight amount, thereby furthering a perfect and equal division of power input to the pair of similar gear wheels. With the proposed construction, there can be no momentary transfers of power from one half of the gear train to the other and there can never be any locked gear train effect.

A further advantage of the preferred mechanism provided by the radius arm structure is that even depth of tooth engagement is obtained and horizontal thrust by the helical gearing, as described more in detail hereinafter, is resisted. This feature is augmented by providing the teeth of the high speed pinion and its two mating gears of helical type having a minimum helix angle. This helps to keep the end thrust of the gears to a minimum and keep the tooth pressure more normal to the teeth surfaces.

In a modified form of construction, the radius arm mechanism includes a rack structure for accommodating the pivoting action and a small relative up and down movement of the power input shaft and its pinion.

A feature of this alternative form of radius arm mounting is that the up and down movement of the pinion shaft would be in a prefectly vertical line and not on a radius. However, as the up and down movement is so small, the amount of deviation from a vertical line, with the pivot shaft mounting, is only a few thousands of an inch. This alternative design of radius arm mounting retains all the advantages of the pivot shaft mounting.

BRIEF DESCRIPTION OF THE DRAWINGS

The embodiments of the invention are illustrated in the accompanying drawing wherein.

Figure 1:
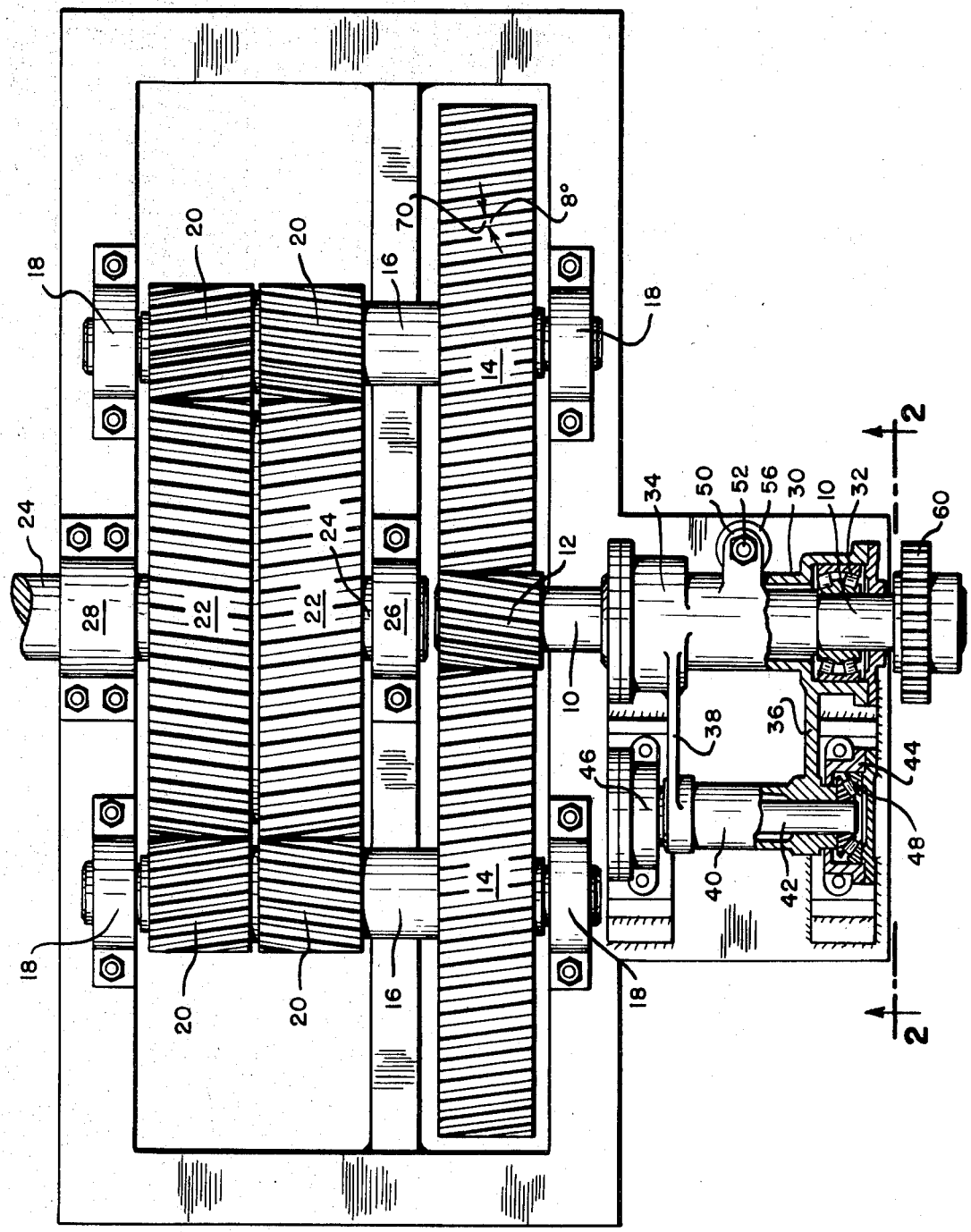
FIG. 1 is a plan view with parts broken away of a reduction gear unit, in which the structure including the preferred form of the invention is shown.

For purposes of illustration, the features of the present invention are shown and described in connection with a reduction gear unit, as shown in FIG. 1, including a high speed power input shaft 10 carrying a pinion 12 meshing with a pair of similar large intermediate gear wheels 14 mounted on parallel shafts 16. The shafts 16 are carried in front and rear bearings 18. Each shaft 16 carries two pinion sections 20 located on opposite sides of a large output gear wheel 22 having double helical teeth, as indicated, and with which the pinion sections 20 mesh. The large output gear wheel 22 is carried on an output shaft 24 supported in bearings 26 and 28.

The high speed input shaft delivers power to the large intermediate gear wheels 14 which in turn drive their respective pinion sections 20 at each side of the large output gear 22. The power provided by the reduction gear unit is finally delivered by the large output shaft 24 to the desired piece of heavy duty machinery, such as a large mill or other machines requiring enormous quantities of power at a relatively slow speed.

The present invention primarily concerns a mechanism for supporting, guiding and floating the input shaft 10 and its pinion 12 provided witdh helically arranged gear teeth. The preferred form of such a mechanism is shown in detail in FIGS. 1 and 2, wherein the input shaft 10 extends through and is supported in an elongated housing 30, so as to provide similar substantially spaced bearing units 32 and 34, unit 32 of which is shown in section. The housing 30 comprises an integral structure called a radius arm including spaced webs 36 and 38 extending laterally from the position of the bearings 32 and 34 to a housing section 40 extending parallel to the shaft 10 and fixed to a pivot shaft 42, the ends of which project respectively into fixed bearing housings 44 and 46, supported in the manner shown. These bearing housings enclose tapered roller bearing units 48 each mounted on an end of the pivot shaft 42 and positioned to prevent longitudinal movement of this shaft and at the same time permit its free pivoting.

Figure 2:
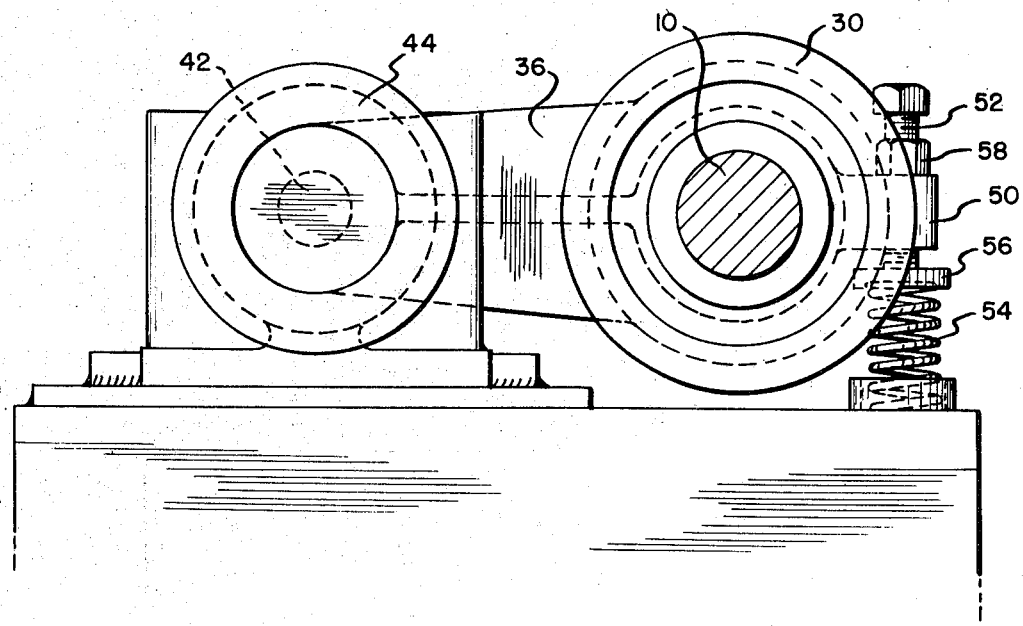
FIG. 2 is a front view of the preferred form of mechanism for supporting, floating and guiding the high speed input shaft and its pinion.

The housing 30 along with the elements 36, 38, 40 and 42, as shown in FIGS. 1 and 2, comprises a rigid structure in that it prevents the input shaft 10 from tilting in any direction, but this structure maintains the shaft 10 in parallel relation to the axes of the shafts 16. The housing 30 is provided with a lug 50 drilled and tapped to receive a threaded stud adjusting means 52. A spring 54 is mounted below the lug 50 under a cap 56 on the lower end of stud 52 to carry the gravity load pivoted from the shaft 42 including the input shaft 10, housing 30 and pinion 12 assembly. The stud is screwed up or down in the lug 50 to adjust the amount of gravity load carried by the compression spring. The position of the drive pinion is determined by its tooth engagement with its two intermediate gears. The only function of the spring is to balance the load of the moving parts. A lock nut 58 is provided on the stud 50. The input end of the shaft 10 is provided with a steel flexible coupling member 60 by which the input shaft is connected to a motor.

During the operation of the reduction gear unit described above, the input shaft 10 and its pinion 12 are guided by the radius arm structure in a floating condition so that the shaft and its pinion may move vertically up and down a slight amount, such movement normally being caused by the automatic adjustment of the pinion with respect to the gear wheels 14, tooth spacing inacuracies occur in the gear train.

Since the amplitude of movement of the input shaft and its pinion is relatively small, the radius arm structure as described and shown constitutes a parallel motion mechanism. It will be understood that if the amplitude of the up and down movement amounted to as much as one half inch for a full size reduction gear unit, in which the distance between the axes of the shafts 10 and 42 is 24 inches the devation from the vertical would only be several thousandths of an inch. For example, the axis of the input shaft 10 would move essentially in a vertical plane.

From the foregoing, it will be apparent that other forms of parallel motion mechanisms may be employed to guide the input shaft and its pinion for slight up and down motion while maintaining the shaft and pinion assembly parallel to the axes of the shafts of the intermediate gear wheels 12. In general, however, it will be necessary that the input shaft be carried in substantially spaced bearings such as the bearings 32 and 34 in order to suitably guide the shaft and prevent tilting during its operation.

Figure 3:
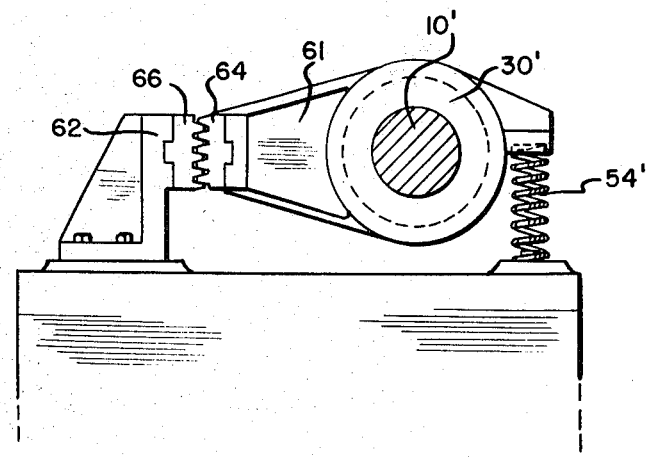
FIG. 3 is a view similar to that of FIG. 2 showing a modified form of mechanism for floating and guiding the power input shaft.

An alternative embodiment to that of the preferred radius arm structure shown in FIGS. 1 and 2 comprises the rack and quadrant structure illustrated in FIG. 3. In this construction the input shaft 10' is supported in spaced bearings the same as shown in FIG. 1, in an elongated housing 30' carrying a radius arm structure 61 extending toward an elongated fixed block 62. The radius arm structure 61 and the block 62 respectively carry rack units 64 and 66 provided with case hardened teeth which intermesh in the manner shown.

The input shaft 10' and its pinion are maintained in normal position for correct tooth engagement in a manner similar to that shown in FIG. 2. During operation, the input shaft 10' and its pinion are carried in a floating condition but guided so that they move essentially only in an up and down direction as the rack 64 pivots on the rack 66. The gravity load of the pinion, pinion shaft and bearing housing is carried by a heavy compression coil spring 54' in a manner similar to that shown in FIG. 2.

The intermeshing teeth of the racks 64 and 66 extend a considerable length in a direction parallel to the shaft 10', so that the shaft is always maintained parallel to its normal setting, that is, parallel to the axes of the intermediate gear wheel shafts. Instead of having elongated rack blocks 64, two pairs of such rack blocks may be provided if they are spaced apart a considerable distance in a direction parallel to the shaft 10', so that there will be no tilting of the input shaft 10' as it oscillates through its up and down movements.

In a reduction gear unit provided by the present invention, the helically arranged teeth of the high speed input floating pinion 12 and the teeth of the gear wheels 14 advantageously have a low helix angle 70 of approximately 8 degrees as illustrated in FIG. 1. The pinion tooth load is extremly high and this low angle has the advantage of preventing any substantial longitudinal movement of the pinion or longitudinal stress on the mechanism for guiding and floating the input shaft and pinion.

As an example of the high load, a 4,000 horsepower unit driven by a 500 r.p.m. motor produces a pinion tooth load, on a 12 inch diameter pinion, acting on each of the two intermediate gear wheels 14 of approximately 40,000 pounds, a load of 80,000 pounds for the two wheels.

The mechanism of the present invention for floating and guiding a high speed drive pinion, while permitting it to move vertically up and down to a limited degree, always gives 100 percent equal division of the applied power to the intermediate gears, thereby avoiding the development of abnormal stresses. The driving forces on each side of the high speed pinion 12 are always equal and opposite in direction, so that they act as a couple, with the result that the force acting on the pinion shaft would be a torsion force only.

The radius arm type of guiding structure for the high speed input shaft functions in such a way that the shaft is maintained parallel to the axes of the two countershafts 16, in both vertical and horizontal planes. This relationship assures perfect pinion tooth alignment with the teeth of the two intermediate gear wheels, and maintains correct depth of tooth engagement. The radius arm type of guide structure is advantageously located outside of the main gear housing where its action and operation are always visible. The high speed input pinion 12 in a unit of the type under consideration must have a certain freedom of up and down movement, which is provided in accordance with this invention, by guiding and floating the input shaft and pinion in the manner described above.

I claim:

1. In a reduction gear unit for power transmissions including a pair of spaced gear wheels mounted on shafts the axes of which are parallel to each other, a power input shaft, a pinion gear means mounted on said power input shaft in meshing relation with said spaced gear wheels, and means for supporting the power input shaft and its pinion gear means in a floating condition relative to said gear wheels, wherein the improvement comprises a pinion gear means consisting of a pinion gear located in the space between and meshing with said gear wheels, a guiding means for floating and guiding the input shaft means including a structure having a pair of spaced bearings spaced from said pinion gear and said gear wheels and in which the input shaft is mounted for rotation, said structure also including cooperating means permitting slight up and down vertical movement of said input shaft and its pinion gear while maintaining the axis of said input shaft parallel to the axes of said pair of shafts during the driving and rotation of said power input shaft, and means cooperating with the guiding means for providing a balanced support of the power input shaft, its bearings and said pinion gear.

2. A reduction gear unit as claimed in claim 1, wherein said guiding means structure includes spaced pivot bearings mounted in laterally fixed positions with respect to and substantially spaced from said input shaft, a pivot shaft mounted in said pivot bearings and means mounted on said pivot shaft extending to and connected with the spaced bearings on the input shaft.

3. A reduction gear unit as claimed in claim 2, including a housing enclosing and supporting the bearings on the input shaft, means rigidly connecting substantially spaced portions of said housing with the pivot shaft, said input and pivot shafts extending substantially horizontally with their axes in the same horizontal plane.

4. A reduction gear unit as claimed in claim 3, including a housing surrounding the pivot shaft between its pivot bearings, said rigid connecting means being connected respectively with spaced portions of the housing around the pivot shaft.

5. A reduction gear unit as claimed in claim 4, wherein the pivot bearings are thrust bearings set in fixed positions against the respective ends of the housing surrounding the pivot shaft.

6. A reduction gear unit as claimed in claim 1, wherein said guiding means structure includes means for restricting the up and down movement of the input shaft, its bearings and said pinion gear to substantially only a vertical movement.

7. A reduction gear unit as claimed in claim 1, wherein said guiding means structure comprises a radius arm one side of which incorporates the spaced bearings on the input shaft, said radius arm extending laterally from the position of the input shaft, and means pivotally mounting the side of said radius arm remote from the input shaft on a pivot axis spaced from and parallel to the axis of the input shaft.

8. A reduction gear unit as claimed in claim 7, wherein the means for supporting and guiding the input shaft includes a spring assembly for counterbalancing the gravity load of the input shaft and its bearings.

References Cited

UNITED STATES PATENTS

| 1,357,674 | 11/1920 | Alquist | 74—410 |
| 1,591,826 | 7/1926 | Hodgkinson | 74—410 |
| 1,806,328 | 5/1931 | Brown | 74—410 |
| 2,995,046 | 8/1961 | Mansachs | 74—410 |
| 3,149,499 | 9/1964 | Schnitter | 74—409 |
| 3,381,509 | 5/1968 | Gay | 74—410 |
| 3,456,520 | 7/1969 | Fritsch | 74—410 |

LEONARD H. GERIN, Primary Examiner